Figure 1:
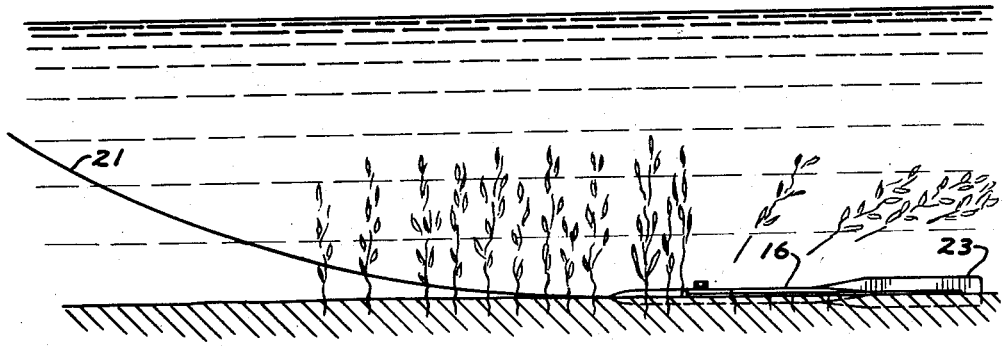

Aug. 16, 1960  M. B. WILCOX  2,949,003
UNDERWATER WEED CUTTER
Filed Jan. 16, 1959  2 Sheets-Sheet 1

INVENTOR.
MERRILL B. WILCOX
BY Braddock and Braddock
ATTORNEYS

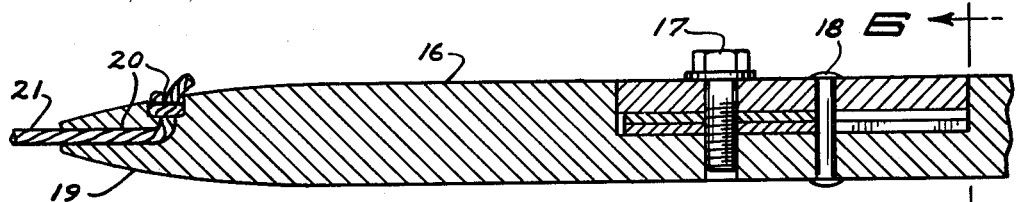
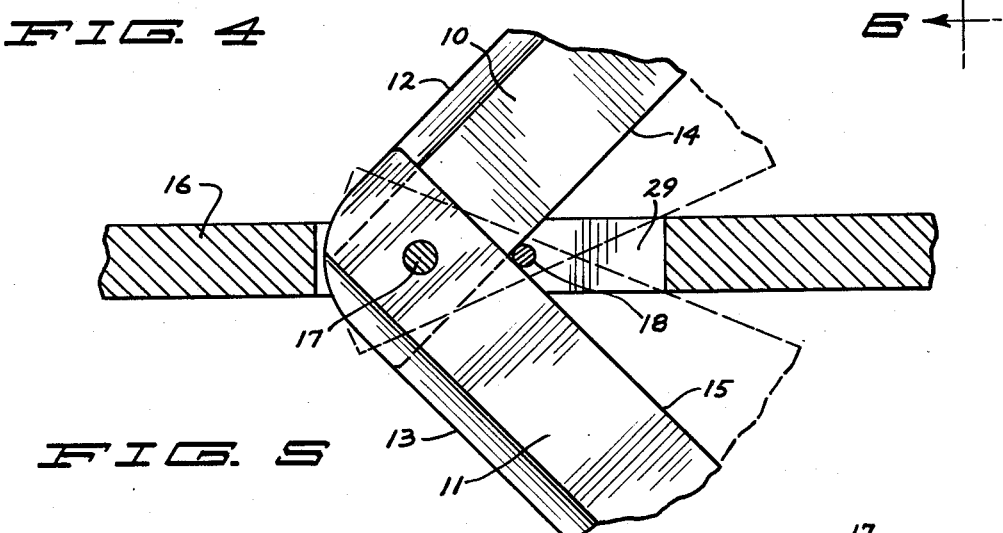
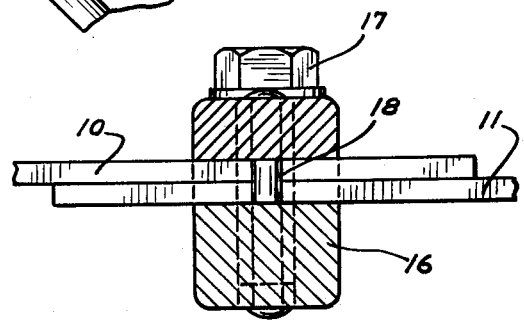
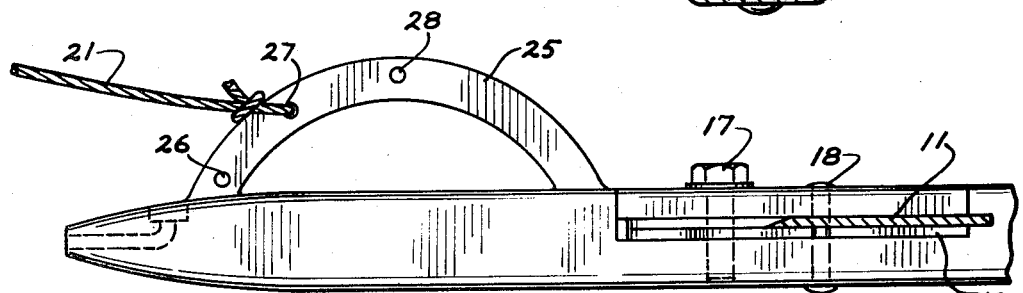

2,949,003

UNDERWATER WEED CUTTER

Merrill B. Wilcox, 809 Hillsdale Ave., Minneapolis, Minn.

Filed Jan. 16, 1959, Ser. No. 787,244

2 Claims. (Cl. 56—8)

This application has relation to an underwater plant or weed cutter of the type described in United States Patent No. 2,702,975. More specifically, it has relation to an improvement on an underwater weed cutter of this type enabling it to cut weeds in a path close to and parallel with the bottom of a lake and enabling it to cut weeds on an irregular and rocky bottom without damage to the equipment involved in the cutting process.

The effectiveness of an underwater weed cutter similar to that described in United States Patent No. 2,702,975, depends in part upon the width of the cutting job. In one trip across the bottom of a lake, a cutter with a greater width of blade can cut a greater area of underwater weeds on any given trip. The effectiveness of the cutter is also dependent upon the rigidity of the blades. They must not yield when coming into contact with tough weeds.

The object of this invention is to provide an underwater weed cutter with the widest possible cutting width while cutting weeds on a bottom which may be rocky or irregular. If the old type of weed cutter passed between two rocks or other immovable objects, its forward motion stopped, the blades became dulled, and either the tow line or the anchoring mechanism on the tow boat often broke. This often resulted in a loss of the cutter and damage to the tow line or to the boat.

The above problem can be solved in three ways:

First: By limiting the width of the cutting surface so the cutter will pass between most obstructions. But this limitation is objectionable because it cuts down the effectiveness of the cutter.

Second: By providing a folding means for the blades so they can yield in width upon contact with any unyielding object. But this provision is objectionable because the blades must be rigid enough to cut tough weeds.

Third: By providing a folding means for the blades so they can yield in width upon contact with any relatively solid object such as a rock, and so they cannot yield upon contact with a relatively less solid object, such as a tough weed.

The objections to the first and second solutions to the problem are not present in this third solution. This third means is the subject matter for this application.

The effectiveness of an underwater weed cutter of the type described in United States Patent No. 2,702,975, is also dependent upon how close the weeds can be cut to the bottom of a lake. In a lake which has a particularly soft bottom, the rearward portion of a cutter of the old type tends to sink down into the soft mud of the lake bottom. The forward portion of the old cutter remains on the surface of the mud because it is supported by the wide surface area of the knives, which are attached to the cutter at its forward portion. The knives distribute the weight of the forward portion of the cutter over a wide area. The rear portion of the cutter has no such large area for support, and therefore sinks below the mud surface. As a result, the cutter rests and travels forward in a position at an angle to the horizontal plane of the lake bottom. Since the rearward portion of the cutter is sunk below the mud surface, the forward portion, including the cutting edges, are above said surface. This means that the weeds are cut off above the surface of the mud. Also, when the old cutter came to rest, it often did so at an angle from the horizontal. When the towing force started again, the cutter had a tendency to follow the angle of the tow rope on an angle with the horizontal. This tended to pull the entire cutter up from the lake bottom.

An object of this invention is to keep the cutter at a horizontal position when the towing force is applied.

Figure 2:
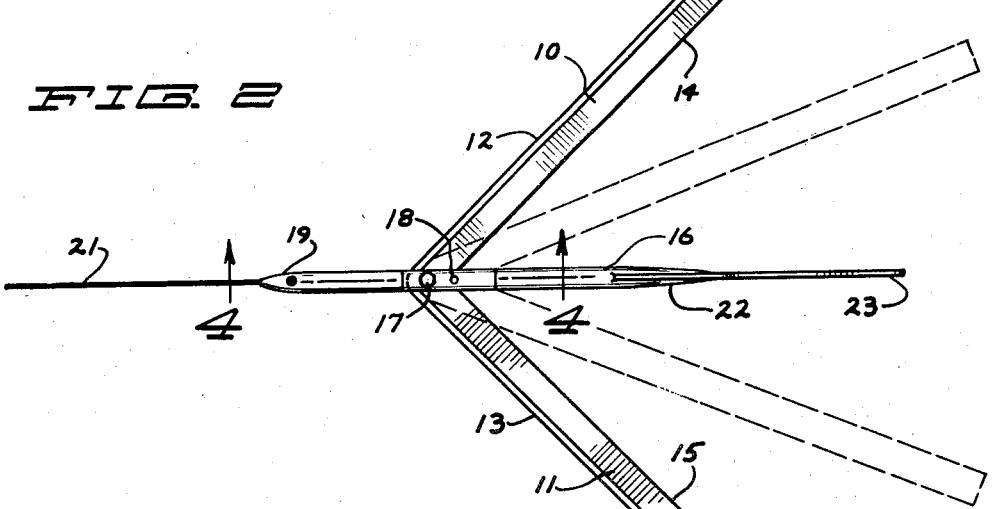
Figure 3:
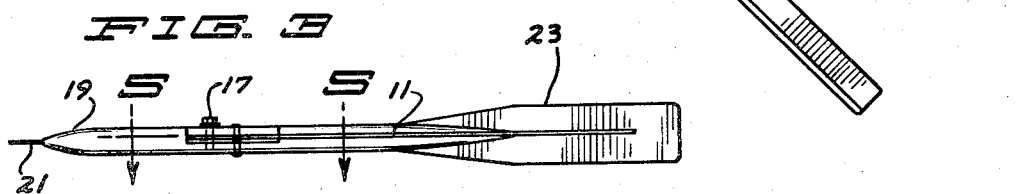
Figure 8:
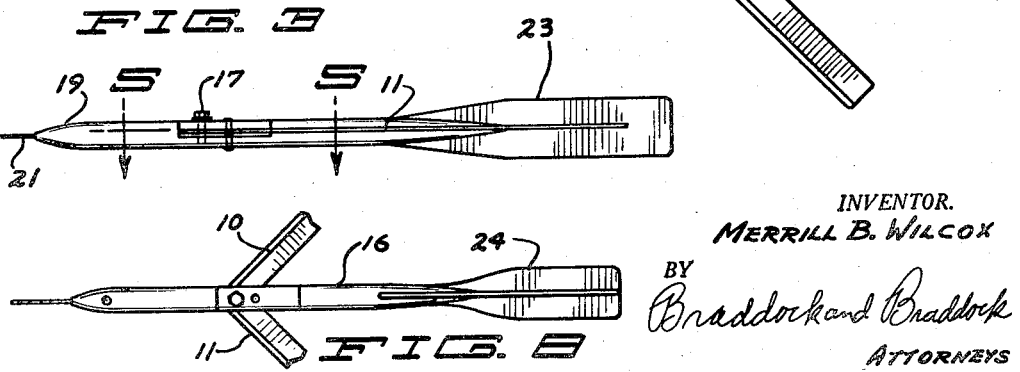

In the accompanying drawings forming a part of this specification,

Fig. 1 is a side elevational view of one embodiment of the invention being towed in a position to cut weeds at the bottom of a lake, Fig. 2 is an enlarged top plan view showing the position of the cutting blades before and after folding, Fig. 3 is an enlarged side elevational view of the invention, as seen in Fig. 1, Fig. 4 is a fragmentary sectional view on an enlarged scale taken along the line 4—4 of Fig. 2, Fig. 5 is a fragmentary sectional view on an enlarged scale taken along the line 5—5 of Fig. 3, Fig. 6 is an enlarged fragmentary sectional view taken along the line 6—6 of Fig. 4, Fig. 7 is a fragmentary side elevational view showing a first modified form of the invention corresponding in part to the view of Fig. 4, and Fig. 8 is a top elevational view showing a second modified form of the invention.

Two knives 10 and 11 with cutting edges 12 and 13, and with rear edges 14 and 15, respectively, are pivotally attached to a guide element 16 by a connecting means 17. The connecting means 17 extends through the guide element 16 and end portions of the knives 10 and 11, said knives being in a position one on top of the other, and coming together, for example, in a horizontal slot 29 in the guide element 16.

Rearward from the connecting means 17 is a shear pin 18 which is adjacent to the rear edges 14 and 15 of the knives 10 and 11 and runs through the guide element 16.

When a cutting edge 12 or 13 meets an unyielding object, such as a rock, the forward motion of the knife 10 or 11 is stopped. The force moving the guide element 16 forward continues. A shear on the pin 18 caused by the rearward portion 14 or 15 of a knife 10 or 11 and by the forward force of the guide element 16 causes the pin to break. The pressure is then relieved as the knife 10 or 11, whichever has met the object, swings inwardly and rearwardly to the guide element 16, until the rear portion 14 or 15 of the knife 10 or 11 is resting at a rear corner of the horizontal slot 29.

The guide element 16 which connects the two knives 10 and 11 bisects the angle formed by the knives. The guide element is made out of material heavier than water so it will sink to the bottom of the lake. A front portion 19 of the guide element 16 tapers to a tip. This front portion 19 has a means 20 for anchoring a towing line 21. The rearward portion 22 of the guide element 16 has a vertical flat element 23, which acts as a fin to keep the guide element from slipping laterally. The pressure of mud and water exerted on both sides of the fin cause the lateral stability.

A second form of the invention is shown in Fig. 7. Means 25 for attaching tow line 22 is connected to the front portion 19 of the guide element 16. On the attaching means 25 are attaching elements, for example, holes 26, 27 and 28. The holes 26, 27 and 28 are situated in a series in relation to the distance from the forward end of the guide element 16 and the distance to the guide element 16. This provides three different places for attaching the tow line 22.

By using a long tow rope, maximum efficiency is achieved because the towing power can be applied at a small angle from the horizontal. A small towing angle means first, that the horizontal power component is almost equal to the power applied, and second, that the front portion 19 of the guide element 16 has less tendency to rise. But, there are reasons why a long tow rope and a small towing angle cannot be used in the towing operation. The surface of the lake may be so small that the towing boat cannot travel at a great distance in front of the cutter. The available tow line may be limited in length. The weeds may be situated as a great depth. In order to permit the efficient use of the cutter with a long tow line at certain times, and a short tow line at other times, the means for attaching the tow rope to the cutter must allow the cutter to travel at the same close angle to the horizontal regardless of the length of the rope and the angle of tow. The second form of the present invention performs this function.

A short towing rope 21 would best be attached to the attaching means 25 at hole 28. Hole 28 is higher and closer to the rear of the cutter and therefore, the towing force is less likely to cause the front portion 19 of the guide element 16 to rise if the tow rope is attached there rather than if the tow rope is attached at hole 26 or 27. On the other hand, a long tow rope may best be attached at hole 26 even though the towing force may tend to pull up the front portion 19 of the guide element 16. If a long tow rope were attached at hole 28, the front portion of the cutter would tend to be pushed down into the mud. Then the resistance of the mud on the cutter would necessitate a greater towing force.

Hole 27 provides an intermediate position for further adjustment in attaching the tow rope relative to the towing angle.

A third form of the invention is shown in Fig. 8. In a plane perpendicular to the plane element 23, there may be a horizontal flat element 24, which acts as a fin to prevent upward and downward movement of the rearward portion 22 of the guide element 16. The pressure of mud and water on both sides of the fin cause the horizontal stability. This means that the guide element 16 and the entire cutter when towed will ride in a relatively horizontal position. An advantage of the horizontal position is that, when the towing force is started again after being stopped, there will be less tendency for the cutter to rise and follow the direction of the towing force. To discourage the tendency to rise, the old type of cutter had to be cast out of heavy metal, such as iron, relying on gravity alone to keep it on the bottom. The present invention does not limit the material to heavy metals, since there is less tendency to rise because of the horizontal flat element, it can be made out of lighter metals, such as aluminum. The light weight makes the cutter easier to handle when it is out of water. It also means that the knives will not be damaged as much upon impact with rocks or other immovable objects since there is less momentum in a lighter cutter.

The horizontal and vertical flat elements 24 and 23 and the yielding cutting blade 10 and 11, interact in the following manner: When a single blade contacts a rock of typically rounded shape, it will tend to be pulled up over the rock or around it, causing the entire cutter to tend to roll up laterally. The presence of a vertical flat element 23 will prevent this lateral roll and the presence of the horizontal flat element 24 will prevent the rise. Therefore, the blades will have difficulty passing over and around the rock. But, the towing force is still being applied. In order to save the tow line 22 and the cutting surfaces 12 and 13, the breaking of the shear pin 18 provides a method of release for the pressure. If the cutter would merely pass over or roll off a rock on the bottom, it would not cut the weeds evenly near the rock. This invention provides a means to do an even cutting job while protecting equipment involved in the job.

What is claimed is:

1. An underwater plant cutter including an elongated guide element having a rearwardly extending vertical stabilizing fin extending along the longitudinal axis thereof, said guide element being provided with a centrally located horizontal slot extending therethrough, a pivot pin mounted in said guide element and extending vertically through said horizontal slot at a forward portion thereof, a pair of flat, elongated knives each pivotally mounted on said guide element about said pivot pin, said knives each extending outwardly and rearwardly from said pivot pin along opposite sides of said guide element, each of said knives having a sharpened leading edge and a trailing edge, a replaceable, frangible, destructible shear pin supported in said guide element and extending through said horizontal slot to be in adjacent contacting relationship to each of said trailing edges of said knives, and a towing line attached to a forward end of said guide element along the longitudinal axis thereof.

2. An underwater plant cutter including an elongated guide element having a rearwardly extending vertical stabilizing fin extending along the longitudinal axis thereof, said guide element being provided with a centrally located horizontal slot extending therethrough, a pivot pin mounted in said guide element and extending vertically through said horizontal slot at a forward portion thereof, a pair of flat, elongated knives each pivotally mounted on said guide element about said pivot pin, said knives each extending outwardly and rearwardly from said pivot pin along opposite sides of said guide element, each of said knives having a sharpened leading edge and a trailing edge, a replaceable, frangible, destructible shear pin supported in said guide element and extending through said horizontal slot to be in adjacent contacting relationship to each of said trailing edges of said knives, and a combination tow bar-handle integral with and extending upwardly from a forward portion of said guide element in a horizontal plane passing through the longitudinal axis of said guide element, said tow bar-handle having a hand grip opening passing therethrough and having a plurality of spaced towline receiving apertures therethrough.

References Cited in the file of this patent

UNITED STATES PATENTS

| | | |
|---|---|---|
| 2,627,156 | Carter | Feb. 3, 1953 |
| 2,702,975 | Friesen | Mar. 1, 1955 |
| 2,864,225 | Williams | Dec. 16, 1958 |